July 19, 1960
C. PARKER
2,945,594
CHART SUPPORT RING
Filed July 30, 1958
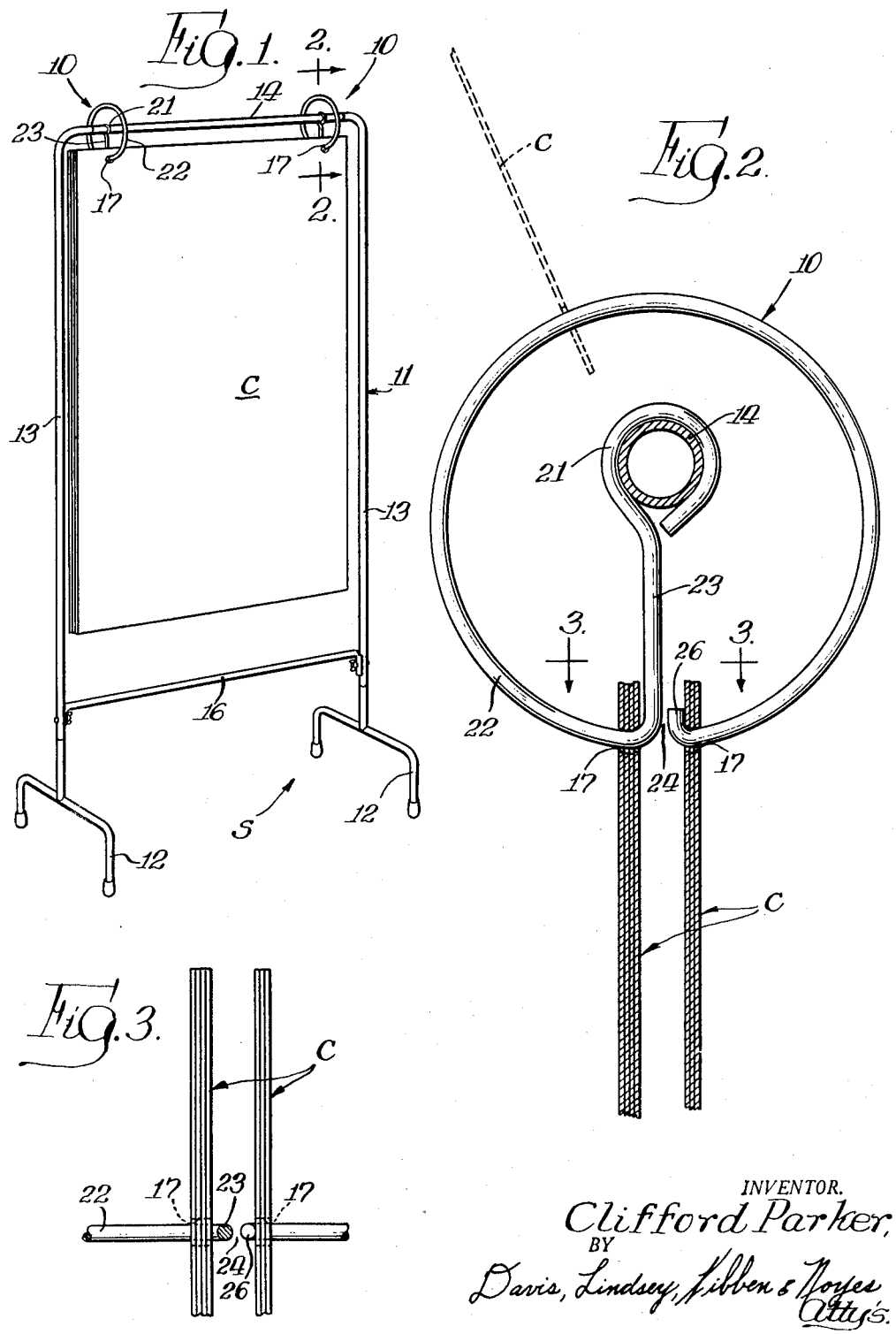
INVENTOR.
Clifford Parker,
BY
Davis, Lindsey, Hibben & Noyes
Attys.

United States Patent Office 2,945,594
Patented July 19, 1960

2,945,594

CHART SUPPORT RING

Clifford Parker, Chicago, Ill., assignor to Ideal School Supply Company, Chicago, Ill., a corporation of Illinois Filed July 30, 1958, Ser. No. 752,006

4 Claims. (Cl. 211—46)

This invention relates to improvements in chart stands and more particularly relates to an improved chart support ring for a chart stand.

Accordingly, it is a general object of the present invention to provide an improved chart support ring for a chart stand.

A specific object of the present invention is to provide an improved chart support ring which permits rapid and positive engagement of a group of charts in supported relationship therewith and which permits the charts to be readily shifted from a position at the front of the group to a position at the rear of the group.

Still another object of the present invention is to provide a chart support ring adapted for use with a chart stand that is simple in construction and economical to manufacture.

Other objects of the present invention will become apparent upon making reference to the following detailed description and accompanying sheet of drawings, in which;

Fig. 1 is a perspective view of a chart stand utilizing a pair of chart support rings constructed according to the principles of the present invention;

Fig. 2 is an enlarged end view along the line 2—2 of Fig. 1; and

Fig. 3 is a fragmentary sectional view taken along the line 3—3 of Fig. 2.

Briefly described, the present invention relates to an improved chart support ring for use in conjunction with an upright chart stand for supporting a plurality of charts or like objects in a vertical depending position from an edge thereof. The chart support rings are adapted to be mounted on an elevated horizontal bar portion of the chart stand such that one or more charts may be suspended from the rings for flip-over movement about the bar. To this end, each chart support ring preferably comprises a one-piece generally centrally disposed eye portion, an enclosing ring portion of greater diameter than the eye portion and a radially extending portion which connects the central eye portion with the enclosing ring portion. The outer enclosing ring portion has an end adjacent the juncture of the radial connecting portion to permit engagement and disengagement of a chart through a gap formed therebetween to permit the charts to be placed on the ring, the end being radially inturned to provide an abutment or stop to prevent accidental disengagement or dislodgement of a chart from the ring. The outer enclosing ring portion of the chart support ring and the central eye portion are eccentric to each other so that the gap in the enclosing ring portion and the inturned end thereof normally are at the lower side of the ring below the eye portion. In order to facilitate flip-over movement of a chart about the horizontal bar of the chart stand the enclosing ring portion has a substantially greater diameter than the diameter of the eye portion.

A chart support ring embodying the invention is adapted for use with any form of stand that has a horizontal bar for receiving one or more of such rings. Thus, for purposes of illustration, Fig. 1 shows a demountable rectangular frame type chart stand S which includes a pair of chart support rings 10 adapted to receive and support a plurality of charts C. The chart stand S shown comprises a rectangular frame-like structure 11 that includes a pair of inverted U-shaped leg forming members 12, a pair of upright members 13 which are centrally connected to and extend vertically upwardly from the members 12 to form the sides of the frame 11, and a pair of upper and lower horizontally disposed crossbars 14 and 16, respectively, which are connected to the upright members 13 to complete the rectangular shape of the frame 11. The latter is shown as being of demountable construction for ease of shipment and for assembling the chart support rings thereon, and to this end, the rectangular frame portion 11 is shown as formed in sections. Thus, the leg members 12 may have a telescopic connection with upright members 13, the lower crossbar 16 may be clamped to the members 13, and the upper crossbar 14 may be telescoped at its ends with bent-over ends of the members 13.

It will be apparent that other types of frames could be used in place of the chart frame S, and other suitable types of construction for the frame S could be employed.

With the chart stand illustrated, a pair of chart support rings 10 embodying the present invention are mounted on the crossbar 14 in spaced relationship therealong to support a chart of substantial size. The chart support rings 10 are slidably mounted on the crossbar 14 to accommodate various sized charts, and the upper edge of each chart C, is provided with perforations 17 to receive the support rings 10.

As shown in Fig. 2, each chart support ring 10 preferably comprises an inner crossbar-engaging eye portion 21, an outer enclosing chart supporting ring portion 22 of substantially greater diameter than the eye portion 21, and a radially extending connecting portion 23. The eye portion 21 preferably is formed with an internal diameter slightly greater than the outside diameter of the crossbar 14 to permit the ring to slide therealong. The diameter of the outer enclosing ring portion 22 is such as to permit a chart C to be easily moved or flipped over from a suspended position at the front of the group of charts to a position at the back thereof, or vice versa, without interference from the eye portion 21.

In order to permit charts to be placed on the ring portion 22, a gap is provided therein. Thus, a gap 24 is formed by spacing one end of the wire, of which the ring is formed, a short distance from the connecting portion 23. To prevent the charts from accidental disengagement from the rings, the end of the wire at the gap 24 is bent radially inward, as at 26, in generally parallel relationship to the connecting portion 23. The inturned end portion 26 thus provides a stop or abutment to prevent accidental disengagement of the charts C from the ring 22.

It is preferred that the charts when in their normal suspended position, be located adjacent the gap 24. For this reason, the eye portion 21 is eccentric to and above the center of the outer enclosing ring portion 22.

The chart supporting ring 10 disclosed herein is preferably made from a single length of wire of suitable diameter. Thus, one end of the wire is bent to form the eye portion 21, and the wire then extends radially to form the connecting portion 23. At the outer end of the connecting portion, the wire is bent into a circle to form the ring portion 22. The other end of the wire is spaced from the connecting portion 23 to form the gap 24 and is bent radially inward to form the portion 26.

Thus, it will be appreciated that the present invention provides a novel chart supporting ring which is simple in construction and economical to manufacture. The charts may be readily placed on the ring or rings and may be easily shifted from a position at the front of a group of charts to a position at the rear thereof. The rings are easily shifted on the crossbar of the frame to accommodate different sizes of charts, and the charts are prevented from being accidentally disengaged from the rings.

I claim:

1. The combination of a horizontal bar, and a chart support ring adapted to be mounted on said bar for supporting one or more charts at a perforated edge thereof for flip-over movement about said bar, said chart support ring comprising a supporting eye portion freely engaging said bar for rotation thereon, a ring portion of greater diameter than and extending about said eye portion, and a radial portion connecting said eye portion with said ring portion, said ring portion having a gap to permit the ring portion to be inserted through a perforation of a chart for suspending the latter therefrom, the ring being rotatable about the bar by the free engagement of the eye portion with the bar, whereby a set of charts when flipped over from the front portion of the ring to the rear portion thereof may be readily shifted to the front portion by rotation of the ring about the bar without shifting the charts.

2. A chart support ring according to claim 1, in which the end of the ring at said gap is bent radially inward and forms an abutment preventing accidental disengagement of a chart from said ring.

3. A chart support ring according to claim 1, in which said eye portion is eccentric to and located above the center of said ring portion of cause the gap to be located at the lower side of the ring.

4. The combination of claim 1, in which said chart support ring comprises a length of wire bent at one end to form said eye portion, the wire extending radially from said eye portion to provide said radial portion and then being bent into a circle to form said ring portion extending about said eye portion, the other end of the wire being spaced from said radial portion to provide said gap and being bent radially inward in generally parallel relation to said radial portion to prevent accidental disengagement of the charts from said ring portion.

References Cited in the file of this patent

UNITED STATES PATENTS

| | | |
|---|---|---|
| 1,711,070 | Suydam | Apr. 20, 1929 |
| 2,269,495 | Trussell | Jan. 13, 1942 |